United States Patent Office 3,669,620
Patented June 13, 1972

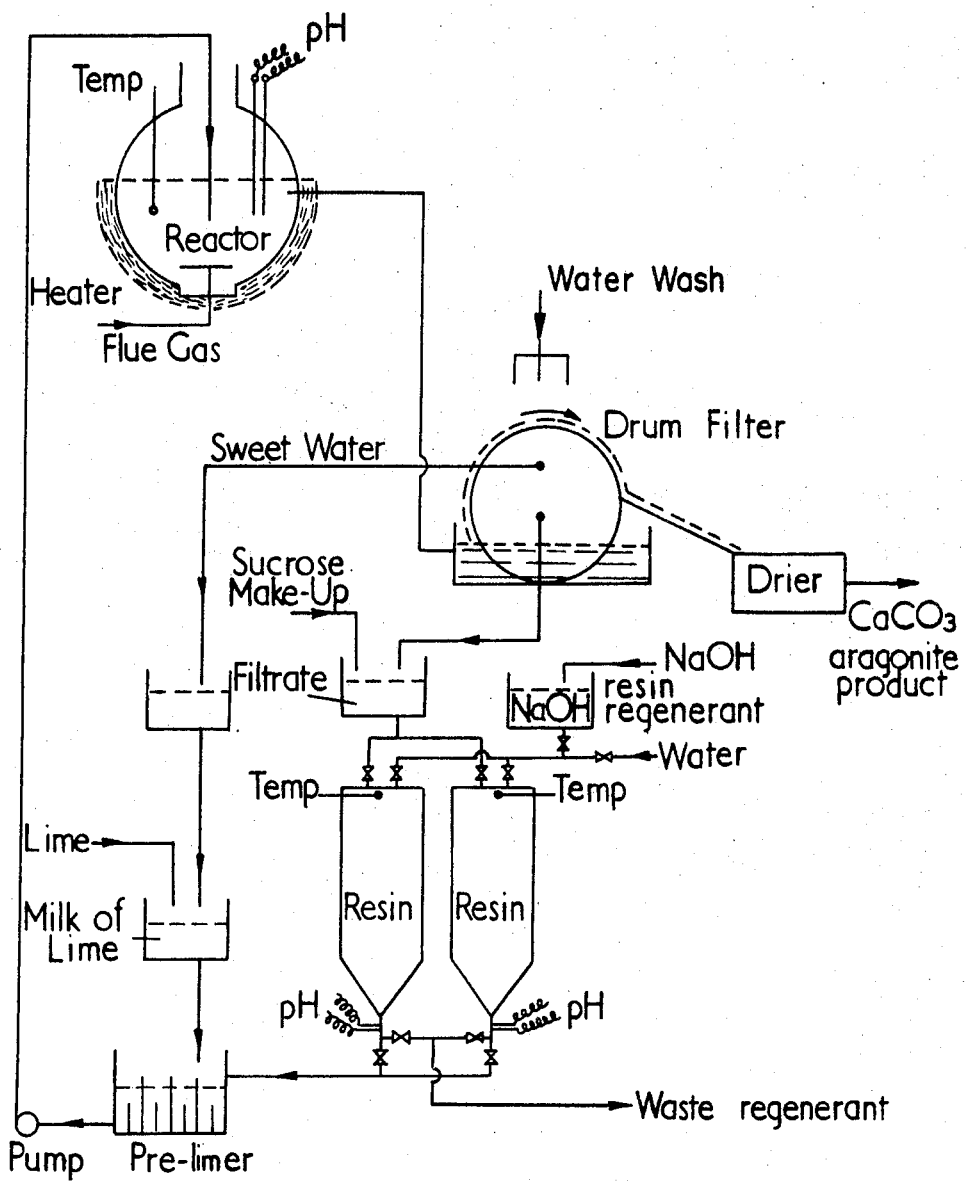

3,669,620
MANUFACTURE OF ARAGONITE
Michael Camm Bennett and Sidney David Gardiner, London, England, assignors to Tate & Lyle Limited, London, England
Filed Sept. 8, 1969, Ser. No. 855,902
Int. Cl. C01f 11/18
U.S. Cl. 23—66          7 Claims

ABSTRACT OF THE DISCLOSURE

Calcium carbonate in needle crystal form is made by dissolving lime in aqueous sucrose solution and treating the solution with carbon dioxide, the sucrose being free from crystal poisons. If the sucrose is to be re-used it must be treated e.g. by anion exchange resin to remove crystal poisons.

---

This invention relates to an improved form of aragonite and to a method of producing it.

Aragonite is a form of calcium carbonate having needle-shaped crystals and physical properties which depend to a large extent on the length of the needles. As available at the present time, manufactured aragonite consists of dense clusters of needles in which the individual needle length is so small that it cannot be seen even under the optical microscope. This product finds application in pharmaceuticals, in dentifrice, as a filler and as a pigment. It is distinguishable from calcite, the normal form of precipitated calcium carbonate, only by its slightly more fluffy appearance, or by sophisticated tests such as X-ray diffraction measurements.

We have now discovered that aragonite can be manufactured in crystal sizes up to needle lengths of 50 microns. In these larger sizes, it manifests many new utilities and can be used in many fields, for example as a filter aid, in cosmetics, and as a filler, as a replacement for the mineral powders already employed. The length of the aragonite needle can to some extent be varied to suit any particular application; for example, as a filter-aid for raw sugar liquors needle lengths in the range 10–25 microns are preferred, whilst for fillers and other applications a smaller particle size may be required.

The invention consists in a method of making aragonite of needle length exceeding 3 microns, which comprises dissolving calcium hydroxide in a sucrose solution and reacting this solution at elevated temperature with carbon dioxide, when the aragonite is precipitated. Pure sucrose and some partially refined white sucrose liquors can be used for making the lime-sugar solution. However, without special treatment, the sugar solutions can only be used once for precipitating aragonite, because of the accumulation of traces of interfering materials thought to be polybasic organic acids which are formed by decomposition of sucrose during the reaction and which prevent the precipitation of the desired aragonite, yielding calcite instead. Some partially refined sugar liquors, for example liquor known in the industry as fine liquor, may already contain traces of the same organic acids and these liquors require treatment before use.

The required aragonite can be made continuously if a continuous supply of fresh sugar or liquor is available, for example in a sugar factory or refinery. Alternatively, according to an important aspect of the invention, the sugar solution can be recycled provided the influence of the interfering crystal poisons is removed. There are two procedures of which we are aware by which this can be achieved. One is to remove the organic acids altogether by the use of an anion exchange resin, or a suitable absorbent, e.g. a carbonaceous absorbent, the other is to remove them from the precipitation reaction by rendering them unavailable, e.g. by progressively adding alkali to the recycled sugar solution. The amount of alkali, such as caustic soda, which is required may be determined in any individual case by simple trial, it will lie within the range 0.1 to 3.0 milliequivalents per litre of NaOH; inevitably, of course, this will lead to an excessive accumulation of sodium ions.

It is preferred that the sucrose concentration should be between 20 and 50° Bx. It is preferred that the carbonation of the lime-sugar solution should be conducted at an elevated temperature of for example 60 to 90° C. at a pH exceeding 7, suitably between 7 and 9 measured at the temperature of the precipitation. It is preferred that the lime concentration in the sugar solution should be between one-half and one-twentieth molar.

The aragonite crystal size will, of course, depend to some extent upon the residence time in the lime-sugar-carbon dioxide reaction mixture. It is preferred that the residence time should be between 15 minutes and 1½ hours. Mainly, however, the aspect ratio is determined by the temperature of the liquor at the liming stage. Thus when liming is conducted at 75° C. the crystal width is about 1½ microns and the mean length 35 microns whilst at 65° C., the mean width is about 2½ microns and the mean length about 20 microns. The aragonite needles are usually precipitated in clusters up to 200 microns in diameter, although separate needles may be formed if desired, by breaking up the clusters.

The process of this invention is illustrated in the accompanying flow sheet which indicates the sequence of operations required for the continuous recycling of the same sugar solution. The flow sheet shows two ion-exchange resin cisterns through which the sugar solution is passed after separation of the precipitated aragonite: these two cisterns are used alternately to permit regeneration of the resin without interrupting the continuous carbonation reaction.

In a typical process according to the invention, a reactor is used having a residence volume of 100 l. and the sucrose solution containing dissolved lime is fed therethrough at a temperature of 80° C. at a rate giving a residence time of 1 hour. A flue gas is fed through at a rate of 170 litres per minute at 40% $CO_2$ absorption, the liquor flow rate being 100 litres per hour. The liquor used is a white liquor diluted to 40° Bx., the liquor entering at 39° Bx. and leaving at 41° Bx. because of some degree of evaporation in the reactor. The lime is used at a feed rate of 1.85 kg. per hour to give a one-quarter molar concentration. The resin which is employed is that known as IRA 400 in the hydroxyl form and the sucrose solution is treated at a maximum temperature of 60° C. The reactants described give aragonite at a rate of 2.5 kg. per hour having a settled bulk volume of 15–30 cc. per g. The mean crystal size is: needle length of 15 microns, mean diameter 3 microns. If the treatment with ion-exchange resin is omitted, the material obtained from the drum filter is calcite instead of aragonite.

The liming of the sucrose solution may be conducted over a wide range of temperature, e.g. 50–90° C., the higher temperatures giving the longer, thinner needles.

We claim:

1. A method of making aragonite which comprises dissolving calcium hydroxide in an aqueous solution of sucrose, reacting this solution at from 60 to 90° C. with carbon dioxide in the absence of crystal poisons, said crystal poisons comprising organic acids which cause precipitation of calcite instead of aragonite, and separating the precipitated aragonite, the sucrose concentration in said solution being between 20 and 50° Brix, the carbonation of the calcium hydroxide-sucrose solution being conducted at a pH of between 7 and 9 measured at said reaction temperature of from 60 to 90° C., the calcium hydroxide concentration in the sucrose solution being between one-half and one-twentieth molar, and the residence time of the precipitated aragonite in the calcium hydroxide-sucrose-carbon dioxide reaction mixture being between 15 minutes and 1½ hours.

2. A method according to claim 1, wherein said sucrose solution contains said crystal poisons, further comprising the step of rendering said crystal poisons unavailable prior to reacting with carbon dioxide.

3. A method according to claim 2, wherein said crystal poisons are rendered unavailable by treatment with an anion exchange resin.

4. A method according to claim 2, wherein said crystal poisons are rendered unavailable an by the addition of an alkali.

5. A method according to claim 1 in which the sugar solution left after separation of the precipitated aragonite is treated to render the crystal poisons unavailable and re-used as said aqueous solution.

6. A method according to claim 5 in which the sugar solution used is recycled after being treated by an anion exchange resin to render the crystal poisons unavailable.

7. A method according to claim 5 in which the sugar solution used is recycled and alkali is added to the recycled solution to render the crystal poisons unavialable.

References Cited

UNITED STATES PATENTS

| | | | |
|---|---|---|---|
| 2,188,663 | 1/1940 | McClure et al. | 23—66 |
| 2,269,608 | 1/1942 | Strieby | 23—66 X |
| 3,340,003 | 9/1967 | Judd | 23—66 |
| 3,443,890 | 5/1969 | Sisson et al. | 23—66 |

OSCAR R. VERTIZ, Primary Examiner

G. ALVARO, Assistant Examiner